United States Patent [19]

Aliberto et al.

[11] Patent Number: 4,504,510

[45] Date of Patent: Mar. 12, 1985

[54] METHOD OF PREPARING FREEZE-THAW AND REFRIGERATOR STABLE PANCAKE BATTER AND PRODUCT THEREOF

[75] Inventors: Ellen S. Aliberto, Beacon; Constance R. Corbett, White Plains; Randall S. McIntyre, Tarrytown, all of N.Y.

[73] Assignee: Stauffer Chemical Company, Westport, Conn.

[21] Appl. No.: 382,996

[22] Filed: May 28, 1982

[51] Int. Cl.$^3$ .............................................. A21D 10/00
[52] U.S. Cl. .................................. 426/553; 426/546; 426/654
[58] Field of Search ............... 426/553, 653, 654, 611, 426/547

[56] References Cited

U.S. PATENT DOCUMENTS

| | | | |
|---|---|---|---|
| 2,982,662 | 5/1961 | Cochran et al. | 426/553 |
| 3,097,098 | 7/1963 | Allen et al. | 426/611 |
| 3,620,763 | 11/1971 | Hans | 426/553 |
| 3,753,734 | 8/1973 | Kaplow | 426/553 |

OTHER PUBLICATIONS

Durkee Product Catalog, 1978, p. 3.

*Primary Examiner*—Raymond Jones
*Assistant Examiner*—Elizabeth A. King
*Attorney, Agent, or Firm*—Paul J. Juettner

[57] ABSTRACT

A freeze-thaw stable aerated pancake batter is provided wherein, in addition to the standard ingredients of flour, sugar and soluble protein, an amount of emulsified plastic shortening sufficient to provide a substantial quantity of stabilized air cells in the batter is utilized. Particularly preferred results are obtained using from about 2% to about 10% of an emulsified plastic shortening wherein the emulsifiers comprising from about 5% to about 6.25% mono- and diglycerides and from about 7.5% to about 9.5% propylene glycol mono- and diesters of fats and fatty acids, said percentages being based on the weight of the emulsified plastic shortening.

22 Claims, No Drawings

METHOD OF PREPARING FREEZE-THAW AND REFRIGERATOR STABLE PANCAKE BATTER AND PRODUCT THEREOF

BACKGROUND OF THE INVENTION

There are numerous restaurants and food service operations which offer, on a twenty-four hour basis, pancakes and waffles. Except for the breakfast hour, it is inconvenient to make up a small amount of batter for each separate order. Batters which are made up and stored in the refrigerator tend to lose, in a very short time, the ability to hold gas and form a pancake which rises properly. Representative pancake batters are shown in the AVI publication Food Products Formulary, Volume II at pages 137–140. A pancake batter prepared and stored overnight in a refrigerator from a recipe such as that on page 138 entitled "Institutional Pancake and Waffle Mix" will separate into an aqueous portion and a solids portion. The material cannot be remixed and the leavening is essentially lost so that an effective pancake cannot be made.

In order to overcome these problems, pancakes have been made in the form of intermediate moisture foods which do not require refrigeration (U.S. Pat. No. 4,154,863). These foods, however, are characterized by an extremely high sugar content.

Frozen batters have also been prepared but these batters must be used once thawed and cannot be refrozen so that use of quantities less than thawed results in waste.

BRIEF SUMMARY OF THE INVENTION

It has been found that refrigerator storage stable, freeze-thaw stable aerated pancake batter can be prepared by utilizing as the shortening therefor an emulsified plastic shortening capable of forming stabilized air cells. The preferred emulsifiers are mono- and diglycerides and propylene glycol esters of fats and fatty acids. Preferably, the shortening and/or the batter or mix therefor also contains lecithin. It has been found that the batter can be mechanically aerated and that a substantial portion of the aeration remains in the batter over extended periods of time such as during storage or freeze-thaw cycling to act as all or a portion of the leavening required.

The pancake batter prepared using the invention can be held in a refrigerator for more than 10 days without separation as occurs in a standard pancake batter using a non-emulsified plastic shortening while providing pancakes of substantially the same quality as from a fresh batter.

The batter of the invention is also freeze-thaw stable and can be stored in the refrigerator for numerous days even after a series of freeze-thaw cycles without substantial loss of aeration.

DETAILED DESCRIPTION OF THE INVENTION

The composition of the invention can be provided as a base containing generally essential non-commodity ingredients, as a complete dry mix or as a batter. The percentage of ingredients in a base is preferably such as to provide the proper amount of the ingredient in the complete mix or the batter. The use of a base allows for the uniform distribution of the shortening and, if desired, chemical leavening throughout the base and hence in the final mix or batter.

The shortening for use in the present invention is an emulsified plastic shortening capable of forming stabilized air cells. The shortening component can be saturated or unsaturated and can be or be derived from naturally occuring fats and oils as well as synthetically prepared glycerides or fractions or mixtures thereof. In general, these glycerides contain fatty acid groups having from 12 to 24 carbon atoms such as the fatty acid groups of lauric, myristic, palmitic, stearic, oleic, linoleic, linolenic, arachidic, behenic and erucic acids.

Examples of suitable base oils are cottonseed, soybean (preferred), peanut, safflower, sesame, sunflower and rapeseed oils. Fish oils such as herring, menhaden and whale oil also can be used. Lard and tallow are typical examples of plastic animal fats which can be used as the glyceride shortening base. The glyceride base can be processed or crystallized using various known techniques.

The plastic shortening can be prepared by known methods. For example, one method is to melt the desired glyceride composition and then supercool rapidly from the molten state to a temperature below the solidifying point of the fat in an apparatus such as a Votator freezer. Another method of processing is to form a uniform suspension of high melting solids in liquid. Other suitable treatment consists of interesterifying mixtures of fatty triglycerides to give a random distribution of the triglycerides or low temperature directed interesterification.

It has been found particularly effective to use as emulsifiers a blend of mono- and diglycerides with propylene glycol esters of fats and fatty acids. Mono- and diglycerides of fats and fatty acids are well known compositions and can be prepared by known methods. The compositions are generally esters of glycerol with saturated or unsaturated fatty acids (or fats which contain these fatty acids) having from about 12 to about 22 carbon atoms such as for example myristic, palmitic, stearic, arachidic and behenic acids; mixtures of the preceding fatty acids whether from animal, vegetable or marine sources. The term monoglyceride is intended to include materials having at least 50% monoglycerides with the remainder being diglycerides and a trace of triglyceride. These compositions can be prepared conveniently by superglycerination of fats and oils (reacting triglyceride fat or oil with an excess of glycerine in the presence of an alkaline catalyst).

The propylene glycol mono- and diesters of fats and fatty acids are also known materials. They can be prepared by reacting propylene glycol with a suitable fatty acid having from about 12 to about 22 carbon atoms as outlined above or combinations or commercial mixtures thereof (such as double or triple pressed stearic acid) in the presence of acid or alkaline catalysts to form the esters by conventional esterification methods. By analagous methods, the propylene glycol can be reacted with fats having the corresponding fatty acid groups of the above mentioned fatty acids in the presence of the acid or alkaline catalyst to form similar esters by conventional interesterification methods.

The preferred emulsifiers are used in the shortening in amounts ranging from about 5% to about 6.25% and preferably from about 5.25% to about 6.1% mono- and diglycerides and from about 7.5% to about 9.5% and preferably from about 7.9% to about 9.1% propylene glycol mono- and diesters of fats or fatty acids. The percentage is based on the weight of the emulsified plastic shortening. The emulsified plastic shortening is used in an amount sufficient to provide a substantial quantity of stabilized air cells and preferably in an amount ranging from about 2% to about 10% and more preferably from about 4% to about 6% based on the dry weight of the dry complete mix.

The emulsified plastic shortening can also contain from about 0.2% to about 0.5% lecithin based on the weight of the emulsified shortening. While lecithin is preferably incorporated as part of the emulsified shortening, it can also be added to the base, mix or batter as a separate ingredient or in the form of egg yolk. Egg and egg yolks are considered undesirable for long-term stability of the frozen batter and use thereof is less preferred.

The emulsifiers are incorporated into the shortening during manufacture such as by blending prior to chilling the fluid shortening in a Votator. These procedures are well known to a skilled artisan.

The flour normally used in pancakes is also usable in forming the compositions of the invention. The flour is generally a cake flour, either bleached and/or unbleached, either hard and/or soft wheat flour including buckwheat flour with lesser amounts of corn and/or rye and/or rice flour. The amount and type of flour used for making pancakes is well known to a skilled artisan. The flour component generally comprises from about 60% to about 80% of the final dry pancake mix. Of the flour component, the wheat flour generally comprises from about 40% to 100% and preferably from about 50% to about 70%; the corn flour from 0% to about 40% and preferably from about 10% to about 20%; the rye flour from 0% to about 20% and preferably from about 5% to about 15%; and the rice flour from 0% to about 15% and preferably from about 5% to about 10%. Preferably, the flour is a combination of wheat flour and corn flour.

It is also preferred that the compositions of the invention contain a water soluble or dispersible protein component. The protein can be derived from dairy products or egg such as whole egg yolk, egg white or powdered forms thereof. The use of egg is not desirable as egg causes discoloration of the batter during storage, particularly beyond 4 days. The preferred dairy product is non-fat dried milk though other sources of dairy protein can also be used such as caseinates (sodium and potassium), buttermilk, whey and whey protein concentrate and mixtures thereof. The milk can also be added as part of the fluid used in making the batter though this is less preferred. The protein component is used in an amount sufficient to provide from about 2% to about 5% protein based on the dry weight of the batter. Preferably, the protein component is derived from about 5% to about 10% non-fat dried milk and from 0% and preferably from about 0.5% to about 3% of a whey protein concentrate having above 40% protein, the milk and the whey protein concentrate being used in amounts sufficient to provide the desired protein level.

The compositions of the invention generally include a sweetening or sugar component, preferably low molecular weight sugars. Useful in the invention are sucrose (cane or beet sugar), dextrose (corn sugar), fructose such as corn syrup solids or mixtures thereof. The sugar component is generally used in an amount ranging from about 5% to about 15% based on the total dry weight of the batter. Preferably blends of from about 5% to about 10% sucrose and from about 2% to about 5% dextrose in an amount sufficient to provide from about 5% to about 15% sweetener are used, said percentages being based on the dry weight of the final pancake batter. Artificial sweetener can be used in place of some or all of the sugar. Due to the greatly increased equivalent sweetening power of some sugars such as fructose and of artificial sweeteners, minor adjustments may be required in the recipe to maintain a proper liquid/solids balance at a desired sweetening level.

The pancake compositions of the invention preferably include chemical leavening systems normally used in pancakes. Leavening generally is accomplished using bicarbonate of soda (soda) and a leavening acid. Suitable leavening acids include sodium aluminum phosphate, anhydrous monocalcium phosphate, monocalcium phosphate monohydrate, sodium acid pyrophosphate, dicalcium phosphate dihydrate and mixtures thereof. The preferred leavening acid is sodium aluminum phosphate optionally combined with monocalcium phosphate monohydrate. The leavening is used in an amount sufficient, in combination with the mechanical aeration, to leaven the pancakes, preferably from about 2% to about 5% by weight of the dry batter. The leavening acid is generally used in an amount theoretically necessary to neutralize all the soda. The soda is generally used in an amount ranging from about 1% to about 2.5%. The preferred sodium aluminum phosphate is generally used in an amount ranging from about 0.5% to about 2%, the percentage being by weight based on the dry weight of the batter.

The chemical leavening is preferably included as an ingredient in the base though it can also be added to the complete mix. Less desirably, the base can contain a portion of the leavening such as the acid, or soda and the remainder can be added along with the ingredients needed to prepare the complete mix.

It is also desirable to include in the pancake batter or base effective amounts of antimycotics and antioxidants for preservation purposes. While the dry base or complete mix or even a liquified batter that is to be used immediately does not require such agents, the batter of the invention is designed for refrigerator storage. Hence, such agents are desirable. It is preferred to utilize a compound of the formula:

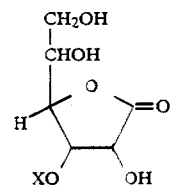

wherein X is hydrogen or alkali metal (sodium or potassium) in an amount ranging from about 0.05% to about 0.15% based on the dry weight of the final batter. Included in this group of compounds is ascorbic acid, sodium or potassium ascorbate, erythorbic acid and sodium or potassium erythorbate, the sodium erythorbate being most preferred. Antimycotics such as benzoic acid and sodium benzoate, sorbic acid and sorbates (sodium, potassium and calcium), propionates and propionate containing products such as whey cultured with *P. shermanii* and the like can also be used. Alkyl parasepts are less preferred as they have a tendency to impart a bitter taste to the pancakes. Bitter taste can be masked with flavors such as vanillin.

Pancake batter generally contains from about 1% to about 5% salt (sodium or potassium chloride) depending on the taste desired. The pancake batter can also include as part of the base or the complete mix other ingredients normally included in pancakes including flavorings such as vanillin or maple flavor, coloring agents, fruit such as dried blueberries and the like in amounts needed to provide the desired effect.

The composition of the invention can be prepared by blending together all the ingredients necessary to make a complete mix or a batter therefrom. If desired, some of the ingredients can be blended together to make a base, preferably the ingredients used in small amounts or ones of a specialized nature not normally stocked by the final user. Since it is essential that the emulsified shortening be evenly distributed throughout the mix for uniform results, and since the base does not contain sufficient dry ingredients to absorb the fat (though the complete mix may not have this problem), it has been found desirable to uniformly blend the emulsified shortening with a bulking agent. Any bulking agent which is neutral to the system and which absorbs fat can be used. Preferred bulking agents are illustrated by tapioca dextrin such as sold under the trademark N-ZORBIT and powdered cellulose sold under the trademark SOLKA-FLOC.

The essential ingredients of the base comprise the emulsified plastic shortening and a bulking agent. In addition to these essential ingredients, the base can include alone or in combination water soluble protein, chemical leavening, and flour. The base can also contain various flavorings and fruits, sugar, salt, antimycotics and stabilizers. The base desirably contains a portion of the flour and all or a portion of the water soluble protein material. If the water soluble protein material is in the liquid form such as whole milk or skim milk, this could be added to the final batter to provide both the protein and the water needed to prepare the batter. A preferred base comprises from about 10% to about 50% emulsified plastic shortening, from about 5% to about 25% bulking agent, from 0% and preferably from about 10% to about 25% water soluble protein, from 0% and preferably from about 10% to about 25% leavening, and from 0% and preferably from about 5% to about 15% flour. The base also preferably includes from about 0.25% to about 0.75% anitoxidant.

The base is generally prepared by blending the dry ingredients except the shortening and the bicarbonate. The dry ingredients with the exception of the flour are preferably used in those amounts needed to supply the proper amounts in the final mix. After thorough blending of these ingredients, the sodium bicarbonate is thoroughly blended in. The emulsified plastic shortening is then finely divided and incrementally added with mixing so that the shortening will be evenly distributed throughout the dry ingredients, uneven distribution being detrimental to an effective product. The addition of the shortening before the bicarbonate is less desirable as this tends to isolate the bicarbonate from the leavening acid thereby affecting the leavening. Clumping is to be avoided. The plastic shortening is preferably not heated since the shortening will separate and the plastic effect will be lost to the detriment of the pancake batter. The base is preferably then milled in a high shear mill such as an Urshell mill or a cake finisher to insure complete dispersion of the shortening in the powdered ingredients.

The complete mix can be made by blending the base with appropriate amounts of flour, sugar and salt. Thorough blending is desirable to insure uniformity. If the complete mix is prepared without using a base, it is desirable to blend all the dry ingredients except the shortening and bicarbonate. After thoroughly blending in the bicarbonate, the shortening is added as described hereinbefore. The bulking agent may not be necessary when preparing the complete mix without using a base.

The complete mix can be made by blending from about 10% to about 30% of the base with about 50% to about 80% flour, sufficient sugar to sweeten to taste, flavor, coloring and preservatives as desired. The base, if it contains the sole quantity of chemical leavening, must be used in an amount sufficient to provide the desired degree of chemical leavening. If less than that amount of base is used, additional leavening may be required.

The batter is prepared by blending from about 45% to about 55% of the complete mix with from about 55% to about 45% water based on the weight of the batter. In terms of the base, from about 5% to about 15% of the base is admixed with from about 25% to about 40% flour, sweetening to taste and sufficient water to make 100%, the percentage being based on the weight of the batter. Liquid ingredients such as milk can be added and used to supply the milk protein (with appropriate deletion of the dry milk solids from the mix if desired) and a portion of the liquid.

The batter is whipped under sufficient mechanical agitation and for a period of time sufficient to incorporate an amount of air into the batter sufficient to provide a specific gravity within the range of from about 0.8 to about 1.0. The incorporation of air into the liquid batter is mainly due to mechanical aeration although some aeration can also be provided by the chemical leavening system. Mechanical aeration alone can provide the necessary aeration of the batter if the ingredients of the chemical leavening system are not interreactive at the temperature and under the conditions of aeration or if the mechanical aeration alone provides the desired leavening effect.

The batter can be used immediately, or stored in the refrigerator for future use or frozen. A substantial proportion of the aeration is not lost during freeze-thaw cycling. The batter can be advantageously whipped and frozen simultaneously using equipment which is designed for the preparation of ice cream and soft serve ice cream. The mixture taken off the ice cream freezer can be packaged and hard frozen for storage.

As used herein the term pancake is intended to include waffles as well as crepes since these batters are to all intent and purpose the same.

The invention will be illustrated in the Examples which follow:

EXAMPLE 1

A pancake batter base was prepared by blending in a high shear blender an unbleached flour, low-heat nonfat dried milk, whey protein concentrate (Alacen 878) having about 80% protein (dry basis), sodium aluminum phosphate, monocalcium phosphate, sodium erythorbate and tapioca dextrin. Sodium bicarbonate was then blended into the dry mix. An emulsified plastic shortening (Cake MIx 96) comprising partially hydrogenated soy bean oil, from about 7.9% to about 8.5% propylene glycol mono- and diesters of fats and fatty acids, from about 5.5% to about 6.1% mono- and diglycerides and lecithin was cut into small pieces and added individually to the blended dry ingredients under agitation. The mixing was continued until the shortening was well dispersed.

The base was made into a complete pancake mix by admixing the base with flour (wheat and corn), sucrose, dextrose and salt. The blend was milled through a cake finisher for additional dispersion of the shortening.

The final pancake batter was prepared by combining 100 grams of batter mix with 110 grams of water at 15.5° C. and aerated such as by whipping at high speed for 3 minutes in a planetary mixer. The fresh batter was acceptable having a viscosity of about 6,000 centipoise using a Brookfield LVT viscometer, spindle 3 and speed 12 at a temperature of 4° C., a pH of about 7.4 and a specific gravity of about 0.87.

The following Table sets forth amounts of ingredients in the base, the complete mix (base plus added ingredients and the percentage of ingredients in the final mix), and the percentage of ingredients in the batter:

TABLE I

| Ingredients | Base % | Complete Mix % Base | Complete Mix % Final | Batter % |
|---|---|---|---|---|
| Base | | 20 | | |
| Flour | 9 | | 1.8 | 0.86 |
| NFDM (Low heat) | 35 | | 7.0 | 3.33 |
| Whey Protein Conc. | 5 | | 1.0 | 0.48 |
| Emul. Plas. Shortening | 25 | | 5.0 | 2.38 |
| SALP | 6 | | 1.2 | 0.57 |
| Monocalcium Phosphate | 1.5 | | 0.3 | 0.14 |
| Sodium Bicarbonate | 8 | | 1.6 | 0.76 |
| Sodium Erythorbate | 0.5 | | 0.1 | 0.05 |
| Bulking Agent - Tapioca Dextrin | 10 | | 2.0 | 0.95 |
| Batter Ingredients | — | | | |
| Wheat Flour | — | 54.5 | 54.5 | 25.95 |
| Corn Flour | — | 14 | 14 | 6.67 |
| Sucrose | — | 7 | 7 | 3.33 |
| Dextrose | — | 2.5 | 2.5 | 1.19 |
| Salt | — | 2 | 2 | 0.95 |
| Total | 100.0 | 100.0 | 100.0 | 47.61 |
| Water | | | | 52.38 |
| | | | | 99.99 |

The pancake batter was tested for use function as follows:
1. Four pancakes were poured onto a lightly greased preheated griddle (190° C.) using an ice cream scoop,
2. The pancakes were cooked for 90 seconds on each side and evaluated,
3. Evaluation
    A. Symmetry—pancakes should not be perfectly round but slightly irregular in shape.
    B. Surface Activity—amount of gas bubbles formed on surface during cooking
        1. Good: >50%
        2. Fair: 25–50%
        3. Poor: <25%
    C. Cellular Fill-in—ability of holes to fill in with batter after the gas bubbles have broken
        1. Good: >50%
        2. Fair: 25–50%
        3. Poor: <25%
    D. Average Diameter of 4 pancakes—acceptable limits 12–14 centimeters
    E. Height of 4 pancakes—acceptable limits 3.5–5.0 centimeters
    F. pH of crumb—after pulling off crust, a few drops of the indicator described below was added and pH development was observed using the following chart for pH determination:

| | |
|---|---|
| Magenta | Alkaline |
| Red | Slightly Alkaline |
| Red Mottled with Yellow | Neutral |
| Yellow Mottled with Red | Slightly Acidic |
| Yellow | Acidic |

1. Acceptable: Alkaline to slightly alkaline
2. Unacceptable: Acidic—pH 6 to 7.0
    a. The indicator was prepared by dispersing 0.9 grams phenol red plus 0.3 grams cresol red in 100–200 milliliters of water. 0.1 normal sodium hydroxide is added until a clear (non-colored) solution is obtained. This solution is diluted with 1000 milliliters of water to form a concentrate. One volume of the concentrate is diluted to 10 volumes with distilled water to make the indicator.

Pancakes were prepared and evaluated from freshly prepared batter and batter that had been stored after thawing for 1, 7 and 10 days at 4° C., the batter having been prepared by whipping for 3 minutes in a planetary mixer. Batter prepared by aerating and freezing in a soft serve ice cream machine, followed by hard freezing and thawing, was subjected to freeze-thaw cycling and used to bake pancakes in the appropriate tests. A freeze-thaw cycle was conducted by freezing batter and after 1 week putting the frozen batter into the refrigerator for 24 hours to thaw. Pancakes were then made and the batter was refrozen statically (1st cycle). After 6 days the batter was again thawed, baked and refrozen (2nd cycle). After 2 days the cycle was repeated (3rd cycle) and after 3 days the cycle was again repeated (4th cycle). The results are reported in Tables II and III as follows:

TABLE II

BATTER OF EXAMPLE I

| | Fresh | 1 day After Thaw.* | 7 days Refrig. After Thaw. | 10 days Refrig. After Thaw. |
|---|---|---|---|---|
| BATTER EVALUATION | | | | |
| Batter Odor | good | good | very slight dough odor | doughy odor |
| Batter Temp. °C. | 3.3° C. | 3.3° C. | 3.3° C. | 3.3° C. |
| Batter Viscosity (cps) | 7,600 | 6,400 | 5,600 | 5,300 |
| Specific Gravity | 0.85 | 0.91 | 0.93 | 0.95 |
| Surface Activity | fair | good | good | good |
| Cellular Fill-in | good | good | fair to good | fair |
| PANCAKE EVALUATION | | | | |
| Crust Character | sl. dark golden brown | sl. dark golden brown | sl. dark golden brown | sl. dark golden brown |
| Height of 4, cm | 4.8 | 4.8 | 4.4 | 4.2 |
| Diameter, cm | 12.00 | 12.75 | 12.42 | 12.65 |
| Spread (height/diam.) | 0.40 | 0.38 | 0.35 | 0.33 |
| Cell Structure | slight uneven small cells | uneven small cells | slight uneven small cells | slight uneven small cells |
| pH of Crumb | alkal. to sl. alkal. | alkal. to sl. alkal. | alkal. to sl. alkal. | alkal. to sl. alkal. |
| Texture | very soft texture slight gummy crumby | good texture slight gummy | good texture slight gummy | soft texture slight gummy |
| BATTER EVALUATION | | | | |

TABLE II-continued
BATTER OF EXAMPLE I

|  | Fresh | 1 day After Thaw.* | 7 days Refrig. After Thaw. | 10 days Refrig. After Thaw. |
|---|---|---|---|---|
| Flavor | accept. | accept. | accept. | accept. |
| Comments |  | improved over the fresh |  |  |

*Frozen for 1 week and thawed in refrigerator for 24 hours.

TABLE III
4 FREEZE-THAW CYCLES

|  | 1st Cycle | 2nd Cycle | 3rd Cycle | 4th Cycle |
|---|---|---|---|---|
| BATTER EVALUATION | | | | |
| Batter Odor | good | slight dough odor | slight dough odor | slight dough odor |
| Batter Temp. °C. | 3.3° C. | 3.3° C. | 3.3° C. | 3.3° C. |
| Batter viscosity (cps) | — | — | — | — |
| Specific Gravity | — | — | — | — |
| Surface Activity | good | good | good | good |
| Cellular Fill-in | poor | poor | fair to poor | poor |
| PANCAKE EVALUATION | | | | |
| Crust Character | sl. dark golden brown | sl. dark golden brown | sl. dark golden brown | sl. dark golden brown |
| Height of 4, cm | 4.0 | 4.0 | 4.0 | 3.6 |
| Diameter, cm | 13.32 | 13.10 | 13.52 | 13.68 |
| Spread | 0.30 | 0.30 | 0.30 | 0.26 |
| Cell Structure | uneven medium cells | uneven small cells | uneven small cells | uneven small cells |
| pH of Crumb | alkal. | alkal. | alkal. | alkal. |
| Texture | good | good | good texture slight gummy | good texture slight gummy |
| Flavor | accept. | accept. | accept. | accept. |

EXAMPLE 2

Example 1 was repeated using a powdered cellulose (Solka-floc) in place of the tapioca dextrin at the same amount. Equivalent results were obtained.

What is claimed is:

1. A method for preparing a refrigerator stable, freeze-thaw stable pancake batter comprising from about 60% to about 80% flour, from about 5% to about 15% sugar, from about 2% to about 5% water soluble protein, and an amount of leavening sufficient to leaven the pancakes and from about 2% to about 10% of an emulsified plastic shortening, said percentages being by weight based on the dry weight of the batter, said emulsifiers of said emulsified plastic shortening comprising from about 5% to about 6.25% mono- and diglycerides and from about 7.5% to about 9.5% propylene glycol mono- and diesters of fats and fatty acids, said latter percentages being based on the weight of said emulsified plastic shortening, which comprises blending said ingredients with a sufficient amount of water to prepare a batter, aerating said batter until a specific gravity ranging from about 0.8 to about 1.0 is obtained and freezing said batter while aerated and maintaining said specific gravity.

2. The method as recited in claim 1 wherein the emulsified plastic shortening further includes from about 0.2% to about 0.5% lecithin based on the weight of the emulsified shortening.

3. The method as recited in claim 1 which further includes an effective amount of an antioxidant.

4. The method as recited in claim 1 wherein said antioxidant is a compound having the formula:

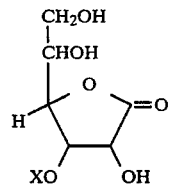

wherein X is hydrogen or an alkali metal of sodium or potassium.

5. The method as recited in claim 1 wherein the antioxidant is sodium erythorbate.

6. The method as recited in claim 1 wherein the plastic shortening is a partially hydrogenated soy bean oil.

7. The method as recited in claim 1 wherein the protein is a milk-derived protein.

8. The method as recited in claim 1 which further includes from about 1% to about 5% bulking agent.

9. The method as recited in claim 8 wherein the bulking agent is tapioca dextrin or powdered cellulose.

10. The method as recited in claim 1 wherein said leavening comprises sodium aluminum phosphate, monocalcium phosphate and sodium bicarbonate.

11. The method as recited in claim 1 wherein said batter is simultaneously aerated and frozen.

12. The method as recited in claim 1 wherein said aeration is accomplished mechanically.

13. A frozen refrigerator stable, freeze-thaw stable pancake batter comprising from about 60% to about 80% flour, from about 5% to about 15% sugar, from about 2% to about 5% water soluble protein, and an amount of leavening sufficient to leaven the pancakes and from about 2% to about 10% of an emulsified plastic shortening, said percentages being by weight based on the dry weight of the batter, said emulsifiers of said emulsified plastic shortening comprising from about 5% to about 6.25% mono- and diglycerides and from about 7.5% to about 9.5% propylene glyclo mono- and diesters of fats and fatty acids, said latter percentages being based on the weight of said emulsified plastic shortening, said pancake batter being frozen at a specific gravity ranging from about 0.8 to about 1.0.

14. The product as recited in claim 13 wherein the emulsified plastic shortening further includes from about 0.2% to about 0.5% lecithin based on the weight of the emulsified shortening.

15. The product as recited in claim 13 which further includes an effective amount of an antioxidant.

16. The product as recited in claim 13 wherein said antioxidant is a compound having the formula:

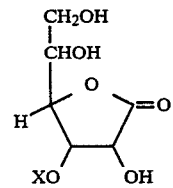

UNITED STATES PATENT AND TRADEMARK OFFICE
CERTIFICATE OF CORRECTION

PATENT NO. : 4,504,510
DATED : March 12, 1985
INVENTOR(S) : E. S. Aliberto et al.

It is certified that error appears in the above—identified patent and that said Letters Patent is hereby corrected as shown below:

Col. 3, line 64, delete "such as" and insert ",";

Col. 4, beginning at line 46 and Claims 4 and 16, formula should be as follows:

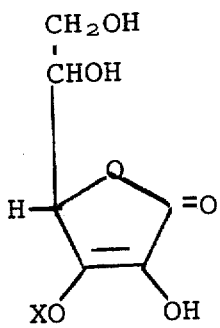

Col. 6, line 63, "MIx" should be "Mix";

Col. 10, line 46, Claim 13, "glyclo" should be "glycol".

Signed and Sealed this

Sixth Day of August 1985

[SEAL]

Attest:

DONALD J. QUIGG

Attesting Officer   Acting Commissioner of Patents and Trademarks